US009300922B2

(12) United States Patent
Huang et al.

(10) Patent No.: US 9,300,922 B2
(45) Date of Patent: Mar. 29, 2016

(54) ANTI-COUNTERFEIT BANKNOTE RECORDER, AN AUTOMATIC TELLER MACHINE AND A SYSTEM

(75) Inventors: Hong Huang, Shenzhen (CN); Xiling Li, Shenzhen (CN); Zhenggang Dai, Shenzhen (CN)

(73) Assignee: Shenzhen Zhengton Electronics Co., Ltd., Shenzhen (CN)

( * ) Notice: Subject to any disclaimer, the term of this patent is extended or adjusted under 35 U.S.C. 154(b) by 378 days.

(21) Appl. No.: 13/811,299

(22) PCT Filed: Jun. 16, 2011

(86) PCT No.: PCT/CN2011/075793
§ 371 (c)(1),
(2), (4) Date: Jan. 21, 2013

(87) PCT Pub. No.: WO2012/010024
PCT Pub. Date: Jan. 26, 2012

(65) Prior Publication Data
US 2013/0120580 A1   May 16, 2013

(30) Foreign Application Priority Data

Jul. 21, 2010 (CN) .......................... 2010 1 0238269

(51) Int. Cl.
G07F 19/00 (2006.01)
G07D 7/12 (2006.01)
H04N 7/18 (2006.01)

(52) U.S. Cl.
CPC .. *H04N 7/18* (2013.01); *G07D 7/12* (2013.01); *G07F 19/207* (2013.01); *G07F 19/209* (2013.01)

(58) Field of Classification Search
CPC ....... G07F 19/207; G07F 19/209; H04N 7/18; G07D 7/12
See application file for complete search history.

(56) References Cited

U.S. PATENT DOCUMENTS

| 8,416,468 | B2* | 4/2013 | Underwood et al. | 358/474 |
| 2005/0097046 | A1* | 5/2005 | Singfield | 705/42 |
| 2005/0207634 | A1* | 9/2005 | Jones et al. | 382/135 |
| 2006/0178918 | A1* | 8/2006 | Mikurak | 705/7 |
| 2007/0272734 | A1* | 11/2007 | Lipton et al. | 235/375 |

FOREIGN PATENT DOCUMENTS

| CN | 101425194 | 5/2009 |
| CN | 101504782 | 8/2009 |

(Continued)

OTHER PUBLICATIONS

Search Report from PCT/CN2011/075793, dated Oct. 13, 2011.

*Primary Examiner* — Jefferey Harold
*Assistant Examiner* — Sean Haiem
(74) *Attorney, Agent, or Firm* — Westman, Champlin & Koehler, P.A.

(57) ABSTRACT

An anti-counterfeit banknote recorder, an automatic teller machine and a system are provided. The recorder includes a microprocessor, a memory, a communication module and a first photographic device. The first photographic device includes a camera and a flasher with different types of rays. The microprocessor is able to regulate the flashlight automatically so as to provide different types of rays according to the optical characteristics on the surface of the banknote under monitoring, and control the camera so as to take photos of the banknote under monitoring, thus, photo information of the banknote is obtained. The microprocessor is able to receive commands from the external equipments via the communication module, thus, the first photographic device is controlled accordingly so as to take photos. Moreover, via the communication module, the microprocessor is able to receive transaction information in relation to the banknotes under monitoring from the external equipments. The microprocessor is able to save the photo information of the banknote and the transaction information to the memory in the form of encryption recording. Thus, transaction process of the counterfeit banknotes on the ATM is automatically and effectively recorded, which is capable of providing truly effective legal basis for the settling of related disputes.

3 Claims, 4 Drawing Sheets

(56) References Cited

FOREIGN PATENT DOCUMENTS

| | | |
|---|---|---|
| CN | 101751714 | 6/2010 |
| CN | 201583991 U | 9/2010 |
| CN | 201689475 U | 12/2010 |
| JP | 2002056439 | 2/2002 |
| KR | 20080096871 | 11/2008 |

* cited by examiner

ANTI-COUNTERFEIT BANKNOTE RECORDER, AN AUTOMATIC TELLER MACHINE AND A SYSTEM

CROSS-REFERENCE TO RELATED APPLICATION

This Application is a Section 371 National Stage Application of International Application No. PCT/CN2011/075793, filed Jun. 16, 2011 and published as WO 2012/010024 on Jan. 26, 2012, not in English, the contents of which are hereby incorporated by reference in their entirety.

TECHNICAL FIELD

The invention relates to a kind of recording equipment, especially a recorder which is able to record the transaction process of banknotes to effectively avoid counterfeit banknotes.

BACKGROUND ART

Under the influences of improving the service efficiency, reducing the service cost and other factors, ATM (Automatic Teller Machine) is applied increasingly deep and broad in the field of financial service. Whether for traditional ATM which fails to provide the service of deposit function or for CSR (Cell Switch Router) widely used in bank halls with self-service deposit and withdrawal function, due to cash flow, moreover, 100% accuracy of the identification capacity for the counterfeit banknotes by the built-in cash-out module of the ATM can't be ensured, conditions that customers withdraw counterfeit banknotes from ATM, banks receive and keep counterfeit banknotes withdrawn from AMT or counterfeit banknotes fail to be confiscated promptly in spite of being recognized are possibly to occur, thus, causing damage to the society. Upon occurrence of such conditions, customers and/or banks will suffer economic losses and troubles, while legal liabilities of the counterfeit banknote providers fail to be investigated effectively for liability related parties often have their own expressions due to the lack of necessary evidences, even the involvement of the third party for example the court or public security organs, due to the lack of concrete evidences, it would not help.

To avoid the above counterfeit banknote conditions occurred to ATM, some technical improvements have been made on ATM. For example, a method to verify the source of the banknote, relevant device and system disclosed by the published Chinese patent application CN101425194A, which is to increase a device to verify the source of the banknotes on the banknote transmission channel of the ATM, so as to reduce the possibility of depositing and withdrawing counterfeit banknotes from the ATM. The device includes an obtaining module for obtaining the information of the transactional object for the banknotes under transaction; an acquisition module for acquiring the original information of the said banknotes under transaction and the banknotes to be verified, wherein, the said original information includes the infrared original information; a first processing module for generating the identification characteristic of the said banknotes under transaction and the banknotes to be verified in accordance with the said original information as acquired from the said acquisition module, wherein, the said identification characteristic includes the infrared identification characteristic information; a memory module for storing the information of the transactional object for the said banknotes under transaction as obtained from the obtaining module and the identification characteristic of the said banknotes under transaction as generated from the first processing module; a first matching module for matching the identification characteristic of the banknotes to be verified as obtained from the said first processing module and the identification characteristic of the banknotes under transaction as stored in the said memory module, generating corresponding matching result, and source of the said banknotes to be verified may be obtained according to the said matching result; and a result output module for outputting the source information of the banknotes obtained from the said first matching module to be verified. As shown by another example, an automatic teller machine with anti-counterfeit banknote function as disclosed by published Chinese patent application CN 101504782A features that the counterfeit banknote identification device is set on the banknote output module, and a true and counterfeit banknote separation device is connected to the identification device.

These existing improvements are all for the further screening and capturing of the counterfeit banknote information during the transmission process of the banknotes inside the ATM, i.e. enhancing the capacity of counterfeit banknote identification for the ATM. However, such capacity depends still totally on the internal equipments of the ATM. Whether customers have withdrawn counterfeit banknotes from the ATM or bank staffs recognize the counterfeit banknote among the cash received and kept from the ATM, context of the counterfeit banknote is failed/difficult to be investigated for the no relation with the ATM. Or, in spite that general route of the counterfeit banknote may be analyzed, the route is failed to be based as the legal evidence for investigating relevant parties.

INVENTION CONTENTS

In view of the above-described problems, the aims of the invention are to avoid defects in the prior art and to provide an anti-counterfeit banknote recorder, an automatic teller machine which possesses the recorder and a system, capable of recording the whole process of the banknotes coming in and going out of the ATM automatically, so as to provide evidences for the counterfeit banknote disputes.

Technical means adopted by the invention for solving the aforementioned technical issues includes the put forward of an anti-counterfeit banknote recorder, comprising a microprocessor, a memory, a communication module and a first photographic device. The first photographic device is composed of a camera and a flasher which has different types of rays. The microprocessor is able to regulate the flashlight automatically so as to provide different types of rays according to the optical characteristics on the surface of the banknote under monitoring, and control the camera so as to take photos of the banknote under monitoring, thus, photo information of the banknote is obtained. The microprocessor is able to receive commands from the external equipments via the communication module, thus, the first photographic device is controlled accordingly so as to take photos. Moreover, via the communication module, the microprocessor is able to receive transaction information in relation to the banknotes under monitoring from the external equipments. The microprocessor is able to save the photo information of the banknotes and the transaction information to the memory in the form of encryption recording.

It further includes a second photographic device, which consists of a camera and a flasher with rays of different strengths. The microprocessor is able to regulate the flasher automatically in accordance with the ambient light condition to provide rays of different strengths, and able to control the camera so as to take photos on the trader who is in relation with the banknotes under monitoring, thus the photo information of the trader is obtained. The microprocessor is able to receive commands from the external equipments via the communication module, thus, the second photographic device is controlled accordingly so as to take photos. The microprocessor is able to save the photo information of the trader, the photo information of the banknote and the transaction information to the memory in the form of encryption recording. Or, the microprocessor is able to obtain the photo information of the trader who is in relation with the banknotes under monitoring from the external equipments via the communication module, and is able to save the photo information of the trader, the photo information of the banknotes and the transaction information to the memory in the form of encryption recording.

Relevant transaction information of the banknotes includes time of the transaction and/or transaction code of the banknotes under monitoring and the account information of the trader.

Records kept by the memory are rewritable, and upon due of the set cycle, records kept by the memory are able to be destroyed automatically. If the microprocessor receives the command of locking a particular record from the external equipments via the communication module before due of the set cycle, upon due of the set cycle, the particular record kept by the memory will be kept locked rather than be destroyed automatically till the microprocessor receives the command of unlocking the particular record from the external equipments via the communication module.

The memory is provided with the physical security protection structure, and records kept by the memory are provided with logical security protection protocol.

Technical means adopted by the invention for solving the aforementioned issues also includes the providing of an automatic teller machine, which includes a shell, a computer inside of the shell, and the aforementioned anti-counterfeit banknote recorder which is set inside of the shell, communicating and connection with the computer as well.

The computer is able to provide counterfeit banknote complaint interface for the trader of the banknotes under monitoring, so that the trader is able to complete the complaint process for the counterfeit banknote as guided by the interface. The computer is able to generate the command of locking a particular record according to the complaint process for the counterfeit banknote, and the command is sent to the anti-counterfeit banknote recorder.

Technical means adopted by the invention for solving the aforementioned issue also includes the put forward of a system, comprising of the aforementioned automatic teller machine and the server for communication and connecting with the automatic teller machine. The computer in the ATM is able to provide counterfeit banknote complaint interface for the trader, so that the trader is able to complete the complaint process for the counterfeit banknote as guided by the interface. The computer is able to generate the command of locking a particular record according to the complaint process for the counterfeit banknotes, and the command is sent to the anti-counterfeit banknote recorder for execution. Besides, the computer is able to generate alarm information to be sent to the server according to the complaint process of the counterfeit banknotes. The computer in the ATM is able to receive the command of obtaining the record kept by the anti-counterfeit banknote recorder from the server, and the command is sent to the anti-counterfeit banknote recorder for execution.

The computer in the ATM is able to receive the command of authorizing to release the lock to the particular record, and the command is sent to the anti-counterfeit banknote recorder for execution.

As compared with the prior art, the anti-counterfeit banknote recorder, the automatic teller machine and the system are able to effectively and automatically record the transaction process of the counterfeit banknotes on the ATM, relevant information is obtained by means of authorization, which is capable of providing truly effective legal basis for the settling of related disputes.

MODE OF CARRYING OUT THE INVENTION

To further illustrate the principle and structure of the invention, the invention is further described in detail in accordance with the preferable embodiments shown in the figures.

Figure 1:
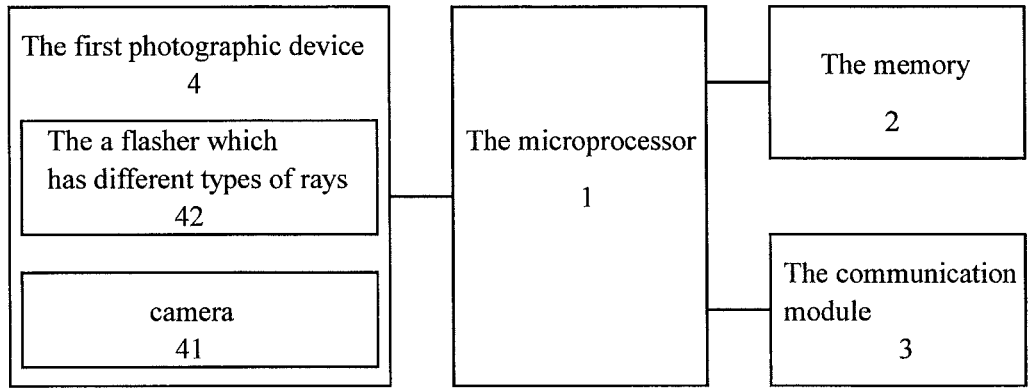
FIG. 1 shows the structure diagram for the embodiment 1 corresponding to the anti-counterfeit banknote recorder of the invention.

As shown in FIG. 1, embodiment 1 of the anti-counterfeit banknote recorder for the invention includes a microprocessor 1, a memory 2, a communication module 3 and a first photographic device 4.

The first photographic device 4 includes a camera 41 and a flasher 42 which possesses rays of different types. During the practical application, the microprocessor 1 is able to regulate the flasher 42 automatically according to the optical property on the surface of the banknote under monitoring to provide rays of different types, and control the camera 41 to take photos on the banknotes under monitoring, thus the photo information of the banknote is obtained. The microprocessor 1 is able to receive commands from the external equipments such as the computer in the ATM and other devices via the communication module 3, thus, control the first photographic device 4 accordingly to take photos. The microprocessor 1 can also receive the transaction information related to the banknotes under monitoring from the external equipments via the communication module 3. The microprocessor 1 is able to save the photo information of the banknotes and the transaction information to the memory 2 in the form of encryption recording.

The flasher 42 may be controlled to provide ordinary light, ultraviolet light and/or infrared light, so as to capture the photo information of the banknotes accurately and comprehensively.

Relevant transaction information of the banknotes includes time of the transaction and for transaction code of the banknotes under monitoring and the account information of the trader, which generally are provided by the computer in the ATM.

Records kept by the memory 2 are rewritable, and upon due of the set cycle, for example the specified time upon the expiration of the three days/seven days, such as zero point, records kept by the memory are able to be destroyed automatically. If the microprocessor 1 receives the command of locking a particular record from the external equipments via the communication module 3 before due of the set cycle, upon due of the set cycle, the particular record kept by the memory 2 will be kept locked rather than be destroyed automatically till the microprocessor 1 receives the command of unlocking the particular record from the external equipments via the communication module 3. What is required to be explained is that the aforementioned automatic destruction strategy is only an example, and there are other means such as loop record and loop rewriting, etc. In view that relevant transaction records must be with timing in general, preferably, there is a real-time clock running on the microprocessor 1, or a real-time clock realized by hardware is connected on the microprocessor 1 (not shown in the figure). For the memory 2 is so important, the hardware structure is designed as the physical security protection structure, and the obtaining of information by authorization is designed as logical security protection protocol, and at any time as well as by any means, the original records can't be destroyed. Automatic destruction of information can only be carried out in accordance with the specific strategies (except that the authorized locked information can't be destroyed). Preferably, FLASH memory is selected for the memory 2; when the anti-counterfeit banknote recorder of the invention is designed as a casket with lock, memory card may be selected directly for the memory 2.

Figure 2:
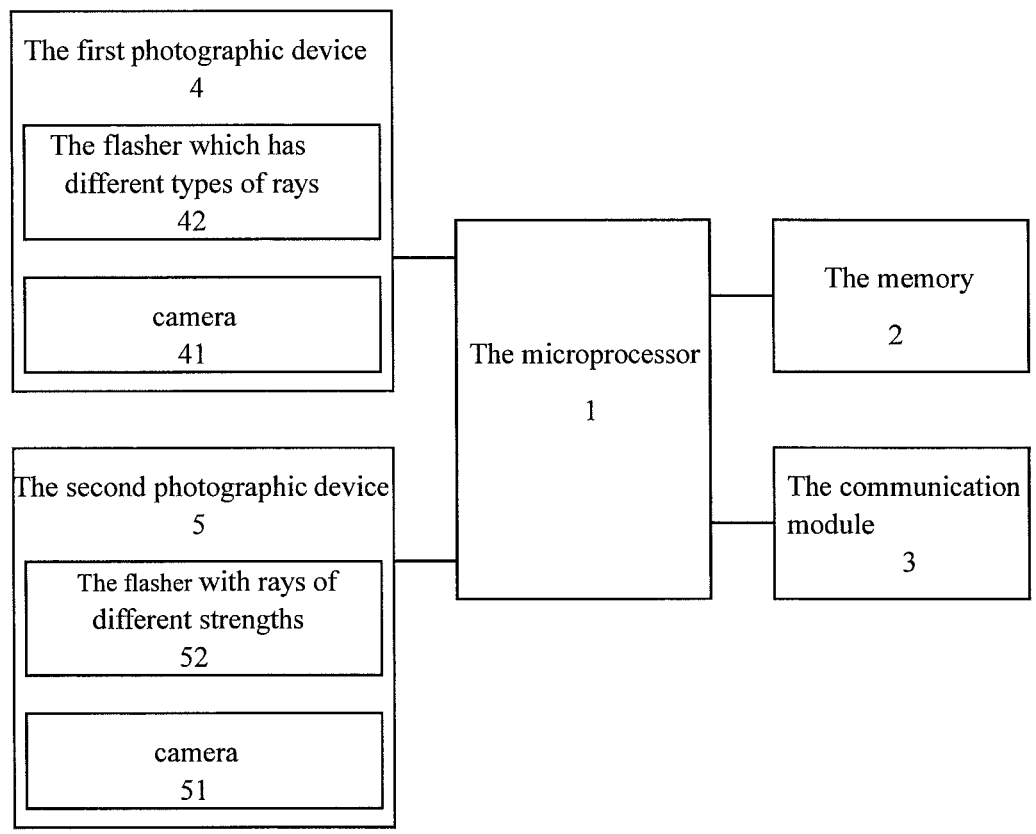
FIG. 2 shows the structure diagram for the embodiment 2 corresponding to the anti-counterfeit banknote recorder of the invention.

As shown in FIG. 2, embodiment 2 of the anti-counterfeit banknote recorder for the invention distinguishes from the aforementioned embodiment 1 by the comprising of as second photographic device 5.

The second photographic device 5 includes a camera 51 and a flasher 52 which possesses rays of different types. The microprocessor 1 is able to regulate the flasher 52 automatically in accordance with the ambient light condition to provide rays of different strengths, and able to control the camera 51 so as to take photos on the trader who is in relation with the banknotes under monitoring, thus the photo information of the trader is obtained. The microprocessor 1 is able to receive commands from the external equipments via the communication module 3, thus, the second photographic device 5 is controlled accordingly so as to take photos. The microprocessor 1 is able to keep the photo information of the trader, the photo information of the banknotes and the transaction information to the memory 2 in the form of encryption recording.

What's required to be specified is that functions of the second photographic device 5 may be carried by the ATM itself, i.e. the ATM is set with the device to take photos on the traders itself. For this condition, as stated by the aforementioned embodiment 1, the second photographic device 5 is needless to be set in the recorder, for the microprocessor 1 is able to obtain the photo information of the traders who are in relation with the banknotes under monitoring from the external equipments via the communication module 3.

Figure 3:
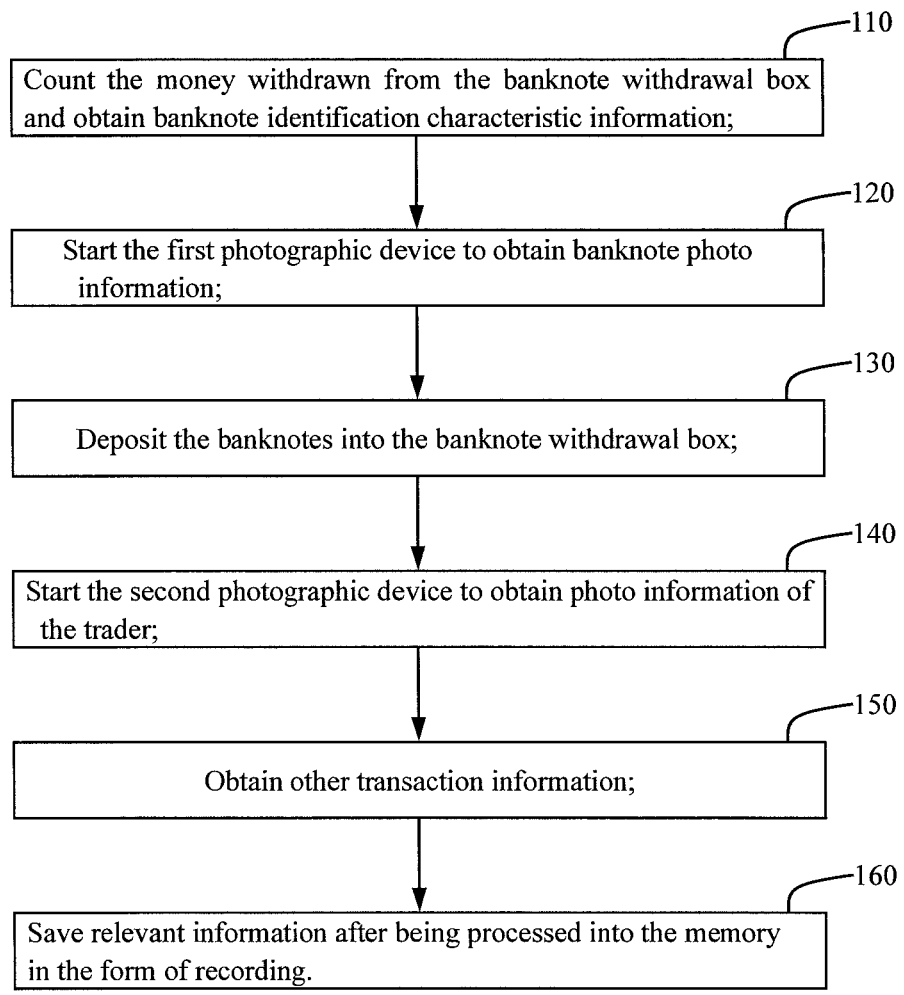
FIG. 3 shows the flow chart for the realization of the banknote deposit process information recording corresponding to the anti-counterfeit banknote recorder of the invention.

FIG. 3 shows the flow chart for the realization of the banknote deposit process information recording corresponding to the anti-counterfeit banknote recorder of the invention. Roughly, there are steps as follows:

Step 110: count the money withdrawn from the banknote withdrawal box and obtain banknote identification characteristic information;

Step 120: start the first photographic device to obtain banknote photo information;

Step 130: deposit the banknotes into the banknote withdrawal box;

Step 140: start the second photographic device to obtain photo information of the trader;

Step 150: obtain other transaction information; and

Step 160: save relevant information after being processed into the memory in the form of recording.

Figure 4:
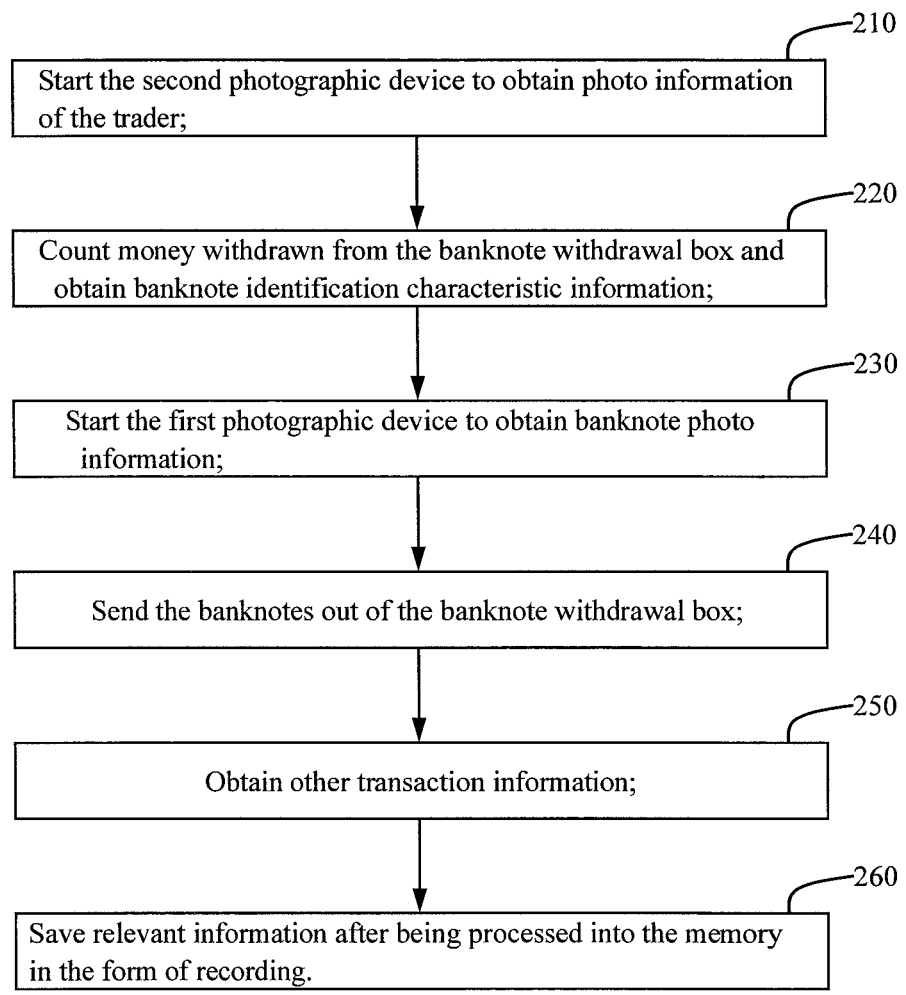
FIG. 4 shows the flow chart for the realization of the banknote withdrawal process information recording corresponding to the anti-counterfeit banknote recorder of the invention.

FIG. 4 shows the flow chart for the realization of the banknote withdrawal process information recording corresponding to the anti-counterfeit banknote recorder of the invention. Roughly, there are steps as follows:

Step 210: start the second photographic device to obtain photo information of the trader;

Step 220: count money withdrawn from the banknote withdrawal box and obtain banknote identification characteristic information;

Step 230: start the first photographic device to obtain banknote photo information;

Step 240: send the banknotes out of the banknote withdrawal box;

Step 250: obtain other transaction information; and

Step 260: save relevant information after being processed into the memory in the form of recording.

What is required to b specified is that the banknote identification information as mentioned in the aforementioned Step 110 and Step 220 refers to the banknote identification information which may be provided by the existing technology, for example infrared identification characteristic information disclosed by published Chinese patent application CN101425194A.

Figure 5:
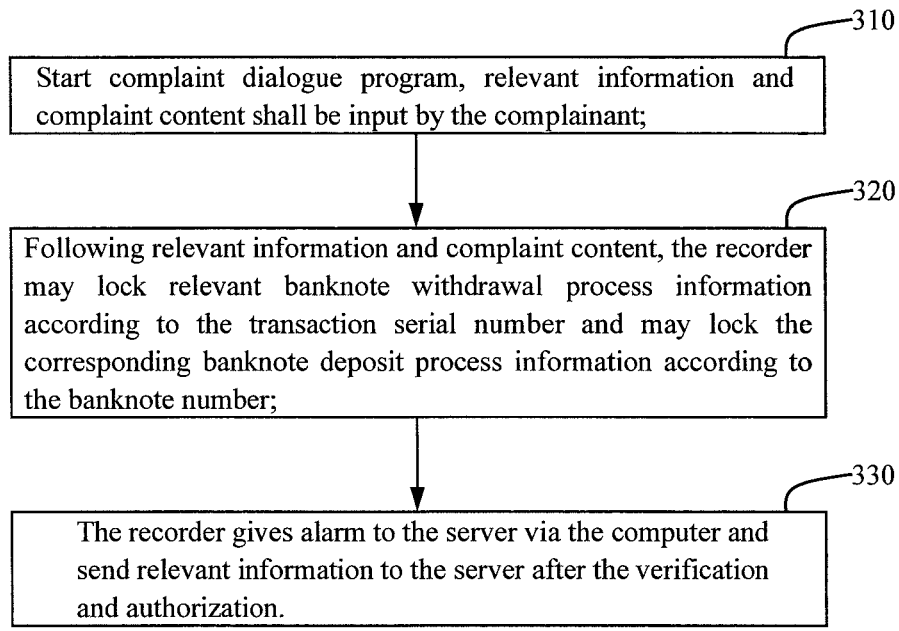
FIG. 5 shows the flow chart for the realization of the counterfeit banknote complaint process on ATM corresponding to the anti-counterfeit banknote recorder of the invention.

FIG. 5 shows the flow chart for the realization of the counterfeit banknote complaint process on ATM of the anti-counterfeit banknote recorder of the invention. The ATM includes the shell, the computer set inside of the shell and the anti-counterfeit banknote recorder communicating and connecting with the computer. The computer is able to provide counterfeit banknote complaint interface for the trader, so that the trader is able to complete the complaint process for the counterfeit banknote as guided by the interface. The computer is able to generate the command of locking a particular record according to the complaint process for the counterfeit banknote, and the command is sent to the anti-counterfeit banknote recorder for execution. Counterfeit banknote complaint process realized by the ATM roughly includes the following steps:

Step 310: start complaint dialogue program, relevant information and complaint content shall be input by the complainant;

Step 320: following relevant information and complaint content, the recorder may lock relevant banknote withdrawal process information according to the transaction serial number and may lock the corresponding banknote deposit process information according to the banknote number;

Step 330: the recorder gives alarm to the server via the computer and send relevant information to the server after the verification and authorization.

Figure 6:
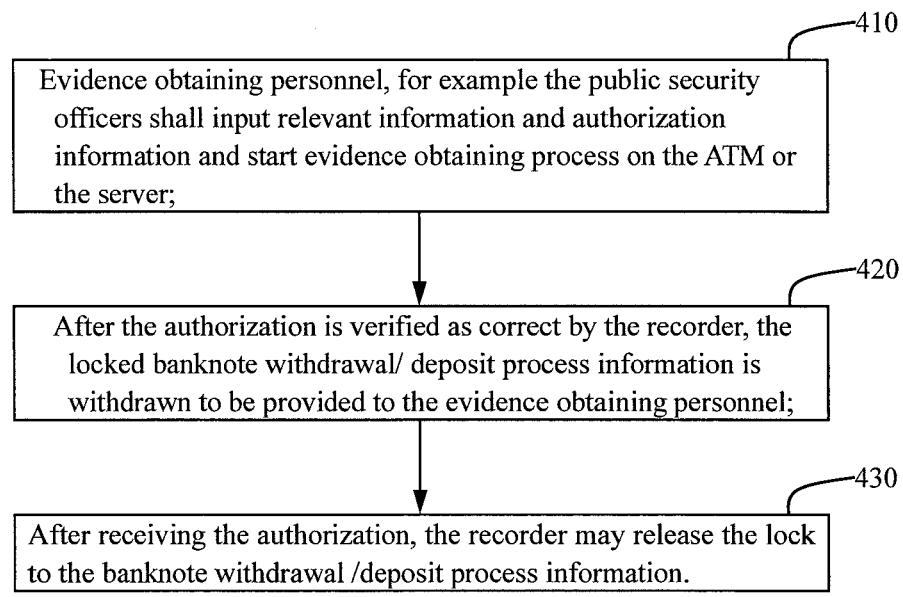
FIG. 6 shows the flow chart for the realization of the counterfeit banknote alarm evidence collection for the system corresponding to the anti-counterfeit banknote recorder of the invention.

FIG. 6 shows the flow chart for the realization of the counterfeit banknote alarm evidence collection for the system corresponding to the anti-counterfeit banknote recorder of the invention. The system includes the aforementioned ATM and the server communicating and connecting with the ATM. The server may be set with the third organization which has no direct interest relationship with the transaction, for example China Union-pay or the public security organ. Counterfeit banknote alarm evidence obtaining process realized by the system roughly includes the following steps:

Step 410: evidence obtaining personnel, for example the public security officers shall input relevant information and authorization information and start evidence obtaining process on the ATM or the server;

Step 420: after the authorization is verified as correct by the recorder, the locked banknote withdrawal/deposit process information is withdrawn to be provided to the evidence obtaining personnel;

Step 430: after receiving the authorization, the recorder may release the lock to the banknote withdrawal/deposit process information.

The aforementioned are only the preferable embodiments of the invention, but not the limitation of the protection scope of the invention, therefore, the equivalent structural change made by applying the instructions of the invention and the contents of the attached drawings are all included in the protection scope of the invention.

What is claimed is:

1. An automatic teller machine, comprising a shell and a computer inside an shell, is characterized in that: it also includes an anti-counterfeit banknote recorder which is set inside of the shell, communicating and connected with the computer, the anti-counterfeit banknote recorder characterized in that: it consists of a microprocessor, a memory, a communication module and a first photographic device; the first photographic device is composed of a camera and a flasher which has different types of rays; the microprocessor is able to regulate the flashlight automatically so as to provide different types of rays according to the optical characteristics on the surface of the banknote under monitoring, and control the camera so as to take photos of the banknote under monitoring, thus, photo information of the banknote is obtained; the microprocessor is able to receive commands from the external equipments via the communication module, thus, the first photographic device is controlled accordingly so as to take photos; moreover, via the communication module, the microprocessor is able to receive transaction information in relation to the banknotes under monitoring from the external equipments; the microprocessor is able to save the photo information of the banknotes and the transaction information to the memory in the form of encryption recording; and wherein the automatic teller machine is characterized in that: the computer is able to provide counterfeit banknote complaint interface for the trader, so that the trader is able to complete the complaint process for the counterfeit banknotes as guided by the interface; the computer is able to generate the command of locking a particular record according to the complaint process for the counterfeit banknotes, and the command is sent to the anti-counterfeit banknote recorder for execution.

2. A system is characterized in that: it consists of the automatic teller machine according to claim 1 and a server for communication and connecting with the automatic teller machine; the computer in the automatic teller machine is able to provide counterfeit banknote complaint interface for the trader, so that the trader is able to complete the complaint process for the counterfeit banknotes as guided by the interface; the computer is able to generate the command of locking a particular record according to the complaint process for the counterfeit banknotes, and the command is sent to the anti-counterfeit banknote recorder for execution, besides, the computer is able to generate alarm information to be sent to the server according to the complaint process of the counterfeit banknotes; the computer in the automatic teller machine is able to receive the command of obtaining the record kept by the anti-counterfeit banknote recorder from the server, and the command is sent to the anti-counterfeit banknote recorder for execution.

3. The system according to claim 2 is characterized in that: the computer in the automatic teller machine is able to receive the command of authorizing to release the lock to the particular record, and the command is sent to the anti-counterfeit banknote recorder for execution.

* * * * *